United States Patent
Kim et al.

(10) Patent No.: US 10,625,559 B2
(45) Date of Patent: Apr. 21, 2020

(54) TUBULAR TYPE TORSION BEAM

(71) Applicants: Hyundai Motor Company, Seoul (KR); Kia Motors Corporation, Seoul (KR); HWASHIN CO., LTD, Yeongcheon, Gyeongsangbuk-Do (KR)

(72) Inventors: Nam Ho Kim, Gwangmyeong (KR); Byong Cheol Kim, Seoul (KR); Jong Kyu Park, Yeongcheon (KR)

(73) Assignees: Hyundai Motor Company, Seoul (KR); Kia Motors Corporation, Seoul (KR); HWASHIN CO., LTD, Yeongcheon, Gyeongsangbuk-Do (KR)

(*) Notice: Subject to any disclaimer, the term of this patent is extended or adjusted under 35 U.S.C. 154(b) by 140 days.

(21) Appl. No.: 15/837,897

(22) Filed: Dec. 11, 2017

(65) Prior Publication Data
US 2019/0111755 A1    Apr. 18, 2019

(30) Foreign Application Priority Data
Oct. 17, 2017   (KR) .................. 10-2017-0134446

(51) Int. Cl.
*B60G 21/05*    (2006.01)
*B60B 35/08*    (2006.01)
*B60B 35/04*    (2006.01)

(52) U.S. Cl.
CPC .......... *B60G 21/051* (2013.01); *B60B 35/08* (2013.01); *B60B 35/04* (2013.01); *B60B 2310/211* (2013.01); *B60B 2310/302* (2013.01); *B60B 2360/141* (2013.01); *B60G 2200/21* (2013.01); *B60G 2200/23* (2013.01); *B60G 2206/012* (2013.01); *B60G 2206/20* (2013.01);
(Continued)

(58) Field of Classification Search
CPC .......... B60G 21/051; B60G 2206/202; B60G 2206/8103; B60G 2206/722; B60G 2200/21; B60G 2200/23; B60G 2206/20; B60G 2206/8201; B60G 2206/8102; B60G 2206/012; B60B 35/08
See application file for complete search history.

(56) References Cited

U.S. PATENT DOCUMENTS 1,863,873 A * 6/1932 Quarnstrom ............ B21C 37/08
                                                138/171
4,983,066 A * 1/1991 Becker .................... B60N 2/682
                                                29/513
(Continued)

FOREIGN PATENT DOCUMENTS

| JP | 2007-069674 A | 3/2007 |
|---|---|---|
| KR | 10-0935018 B1 | 1/2010 |
| KR | 2017-0065045 A | 6/2017 |

*Primary Examiner* — Frank B Vanaman
(74) *Attorney, Agent, or Firm* — Mintz Levin Cohn Ferris Glovsky and Popeo, P.C.; Peter F. Corless

(57) ABSTRACT

A tubular type torsion beam is manufactured by bending and welding and coupling a plate material. The plate material has a plurality of protrusions disposed on a plurality of side surfaces in a width direction of the vehicle. The torsion beam is manufactured by molding the plate material in a pipe shape by bending the plate material in the width direction and molding the plate material to dispose the plurality of protrusions to contact each other to form a gap between the plurality of side surfaces of the plate material and then welding and coupling the plurality of side surfaces of the plate material.

9 Claims, 6 Drawing Sheets

(52) U.S. Cl.
CPC .. *B60G 2206/202* (2013.01); *B60G 2206/722* (2013.01); *B60G 2206/8102* (2013.01); *B60G 2206/8103* (2013.01); *B60G 2206/8201* (2013.01)

(56) References Cited

U.S. PATENT DOCUMENTS

| | | | | |
|---|---|---|---|---|
| 6,145,271 | A | * | 11/2000 | Kossmeier ........... B60G 21/051 296/146.6 |
| 6,510,763 | B1 | * | 1/2003 | Streubel ............... B60G 21/051 74/588 |
| 8,646,789 | B2 | | 2/2014 | Ohdo et al. |
| 2002/0117890 | A1 | * | 8/2002 | Glaser .................... B60G 7/001 301/127 |
| 2004/0051268 | A1 | * | 3/2004 | Chan ...................... B60G 7/001 280/124.1 |
| 2004/0256828 | A1 | * | 12/2004 | Han ..................... B60G 21/051 280/124.106 |
| 2006/0059974 | A1 | * | 3/2006 | Park .................... B21D 41/045 72/398 |
| 2007/0074940 | A1 | * | 4/2007 | Narishima ......... B60G 21/0551 188/321.11 |
| 2009/0014975 | A1 | * | 1/2009 | Lee ........................ B60B 35/04 280/124.116 |

* cited by examiner (a)           (b)           (c)

TUBULAR TYPE TORSION BEAM

CROSS REFERENCE TO RELATED APPLICATION

The present application claims priority to Korean Patent Application No. 10-2017-0134446 filed on Oct. 17, 2017, the entire contents of which are incorporated herein for all purposes by this reference.

BACKGROUND

1. Technical Field of the Disclosure

The present disclosure relates to a tubular type torsion beam, and more particularly, to a tubular type torsion beam manufactured by bending and coupling a plate material.

2. Description of Related Art

Generally, a suspension of a vehicle prevents damage to a vehicle body and cargo. The comfort of the ride of the vehicle is improved by preventing vibrations or shocks received from a road surface from being transmitted to the vehicle body during operation of the vehicle by connecting a vehicle axle and the vehicle body and is generally classified as a front suspension and a rear suspension. Coupled torsion beam axles are primarily used for the rear suspension of light-weight and compact vehicles, which exhibit relatively high driving stability compared to low unit price and mass. When pitching of the vehicle body occurs during operation of the vehicle the coupled torsion beam axle absorbs the pitching through torsional elastic force of a member and secures the turning stability by enhancing roll stiffness when the vehicle is subjected to turning during operation of the vehicle.

The coupled torsion beam axle has a structure with trailing arms coupled to a plurality of ends of the coupled torsion beam axle, respectively and components (e.g., a wheel, a shock absorber, and a coil spring) are connected through the trailing arm. Therefore, when the components coupled in the coupled torsion beam axle, both end portions where stress concentrates have a high rigidity and strength and a middle portion between the pluraity of end portions has low rigidity and strength compared with the end portions to smoothly generate torsion. However, a general tubular type torsion beam axle in the related art is manufactured by molding a center portion of a pipe into a U-shape or a V-shape and expanding a plurality of end portions and coupling the expanded plurality of end portions to the trailing arm. When a thickness decreases while expanding the plurality of end portions the durability deteriorates and to prevent deterioration when the pipe is manufactured with a large thickness the torsion of the center portion is weakened.

The matters described as the related art have been provided merely for assisting in the understanding for the background of the present disclosure and should not be considered as corresponding to the related art known to those skilled in the art.

SUMMARY

The present disclosure provides a tubular type torsion beam manufactured by bending a plate material to strengthen torsional force and durability.

In an aspect of an exemplary embodiment of the present disclosure, a tubular type torsion beam may include a plate material formed by bending and welding and coupling. The plate material may have a plurality of protrusions on the plurality of side surfaces in a width direction of the vehicle. The torsion beam may be manufactured by molding the plate material in a pipe shape by bending the plate material in the width direction and molding the plate material to form the plurality of protrusions to contact each other to form a gap between the plurality of side surfaces of the plate material, and thereafter, welding and coupling the plurality of side surfaces of the plate material.

In some exemplary embodiments, the torsion beam may be divided into a pipe-shaped central portion having a cross section with a concave lower portion (e.g., concave in an inverse U shape), a pipe-shaped coupling portion disposed on the plurality of end portions of the central portion and coupled with a trailing arm and having a cross section having no recessed portion, and a pipe-shaped variable portion formed between the central portion and the coupling portion and having a cross-sectional shape which may be gradually changed. The torsion beam may be manufactured by a plate material having a width-direction length that increases toward the coupling portion from the central portion.

In other exemplary embodiments, the plurality of protrusions may be formed on the plurality of widthwise side surfaces of the central portion in the plate material and may be formed in a symmetric shape spaced apart from each other by a predetermined gap in a longitudinal direction from the center of the central portion.

Additionally, at least one protrusion may be formed on the plurality of widthwise side surfaces of the variable portion in the plate material. At least one protrusion may be formed on the plurality of widthwise side surfaces of the coupling portion in the plate material, and a pair of protrusions among the protrusions formed on the pluarality of widthwise side surfaces of the coupling portion may be formed at a longitudinal end portion of the plate material and surface-coupled with the trailing arm. A width of the protrusion formed in the coupling portion may be equal to or greater than a width in which the coupling portion and the trailing arm are surface-coupled with each other. The width of the protrusion may be equal to or greater than the thickness of the plate material that forms the body.

The central portion may be divided into a first upper plate material that forms a portion where the pluraity of widthwise side surfaces of the plate material are coupled (e.g., welded or the like) and a first lower plate material formed by the central portion of the plate material, the first upper plate material may be formed in a round shape having the first upper plate material is convex in an upward direction, and the first lower plate material may be molded to be press-inserted in an interior direction of the central portion and may contact the interior surface of the first upper plate material and may prevent contact with the central portion of the first upper plate material.

In some exemplary embodiments, the variable portion may be divided into a second upper plate material formed by the portion where the both widthwise side surfaces of the plate material are coupled together (e.g., welded) and a second lower plate material formed by the central portion of the plate material. The second upper plate material may be formed in the round shape having the second upper plate material formed in a convex shape in an upward direction. The second lower plate material may be molded to be press-inserted in the interior direction of the variable portion and may prevent contact with the second upper plate material.

The coupling portion may be divided into a third upper plate material formed the portion with the plurality of widthwise side surfaces of the plate material are coupled (e.g., welded) and a third lower plate material formed by the central portion of the plate material. The third upper plate material may be formed in the round shape having the second upper plate material formed in a convex shape in an upward direction. The third lower plate material may be formed in a round shape with the third lower plate material formed in a convex shape in a downward direction and formed in a shape in which the third lower plate material having a curvature less than the third upper plate material.

BRIEF DESCRIPTION OF THE DRAWINGS

The above and other objects, features, and advantages of the present disclosure will be more clearly understood from the following detailed description taken in conjunction with the accompanying drawings, in which.

DETAILED DESCRIPTION

The terms used herein is for the purpose of describing specific exemplary embodiments only and are not intended to be limiting of the present disclosure. The singular forms used herein include plural forms as well, if the phrases do not clearly have the opposite meaning. "Including" used in the specification means that a specific feature, region, integer, step, operation, element and/or component is embodied and the presence or addition of other specific features, regions, integer, steps, operations, elements, components, and/or groups is not excluded.

Unless defined otherwise, all terms including technical and scientific terms used herein have the same meaning as commonly understood by those skilled in the art to which the present disclosure belongs. Commonly used predefined terms are further interpreted as having a meaning consistent with the relevant technical literature and the present disclosure, and are not to be construed as ideal or very formal meanings unless defined otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%. 0.1%, 0.0%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
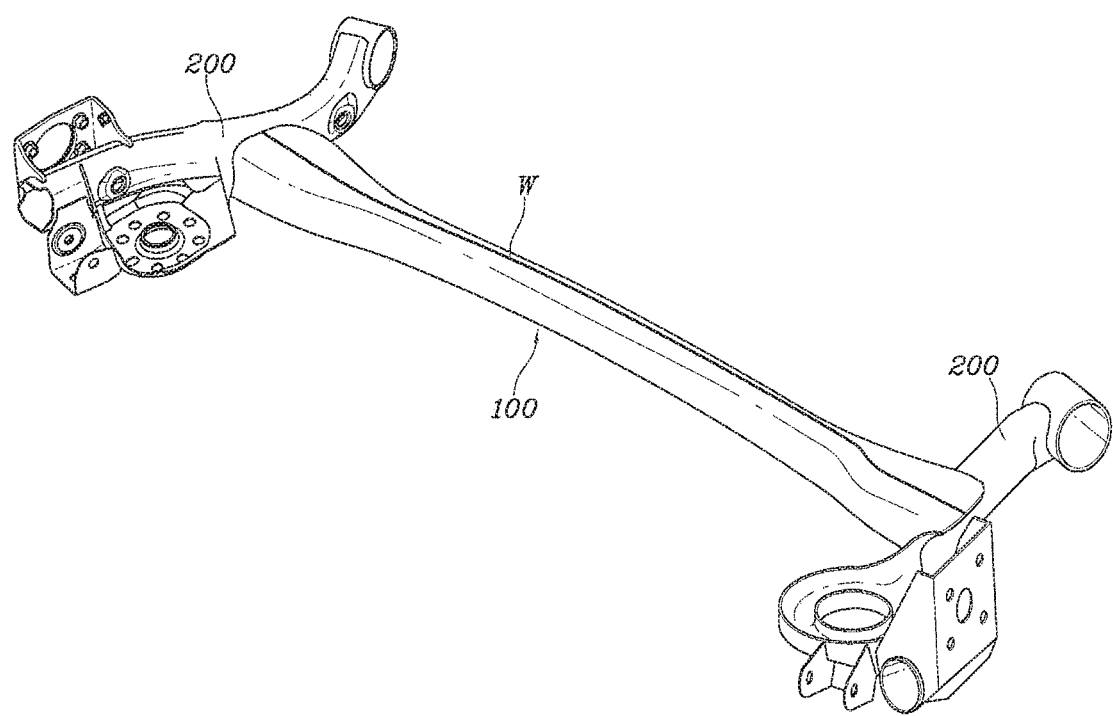
FIG. 1 is an exemplary perspective view illustrating a torsion beam coupled to a trailing arm according to an exemplary embodiment of the present disclosure.
Figure 2:
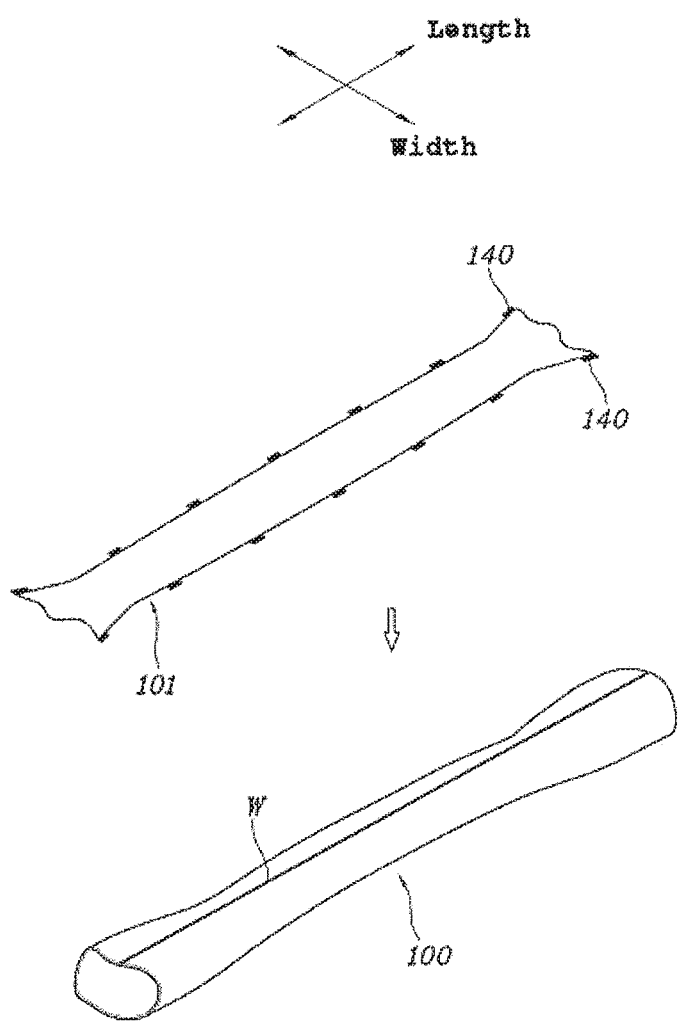
FIG. 2 is an exemplary diagram illustrating a shape of a plate material for manufacturing a torsion beam according to an exemplary embodiment of the present disclosure.
Figure 3:
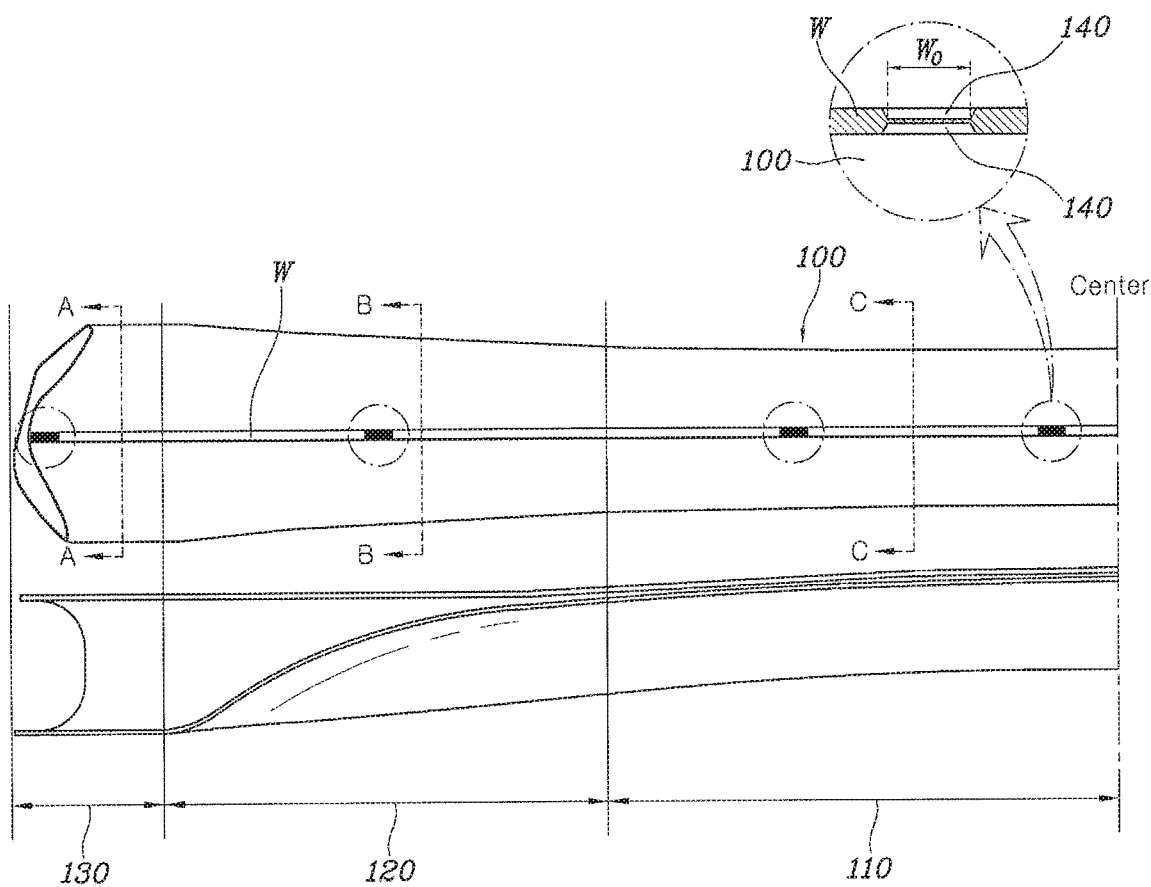
FIG. 3 is an exemplary plan view and a side cross-sectional view of the torsion beam according to an exemplary embodiment of the present disclosure.
Figure 4A:
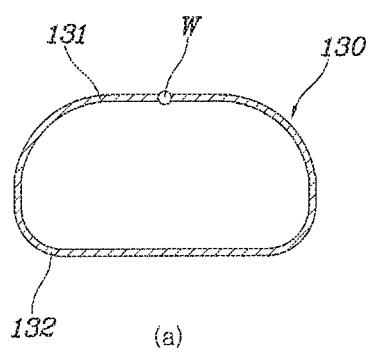
FIG. 4A illustrates an exemplary A-A cross section of FIG. 3.
Figure 4B:
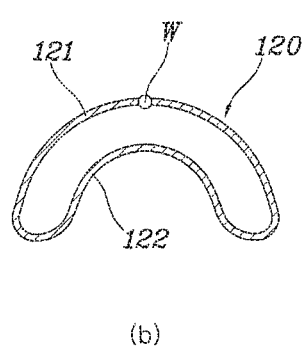
FIG. 4B illustrates an exemplary B-B cross section of FIG. 3.
Figure 4C:
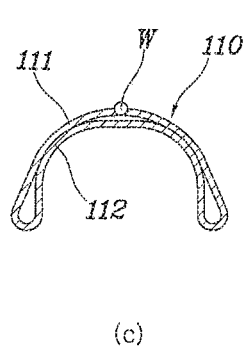
FIG. 4C illustrates an exemplary C-C cross section of FIG. 3.
Figure 5:
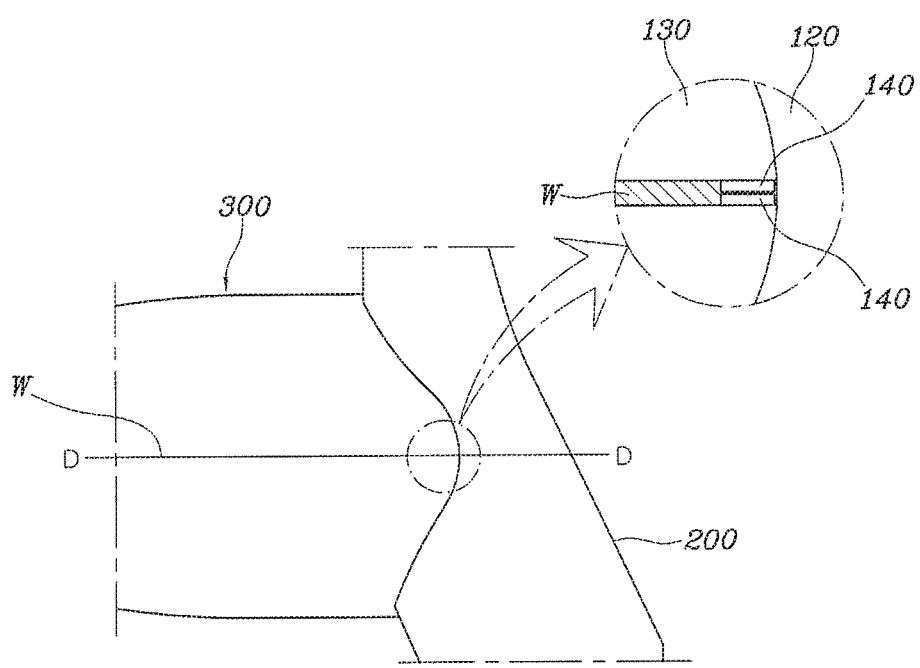
FIGS. 5 and 6 are exemplary diagrams illustrating a coupling portion of the torsion beam and the trailing arm according to an exemplary embodiment of the present disclosure.
Figure 6:
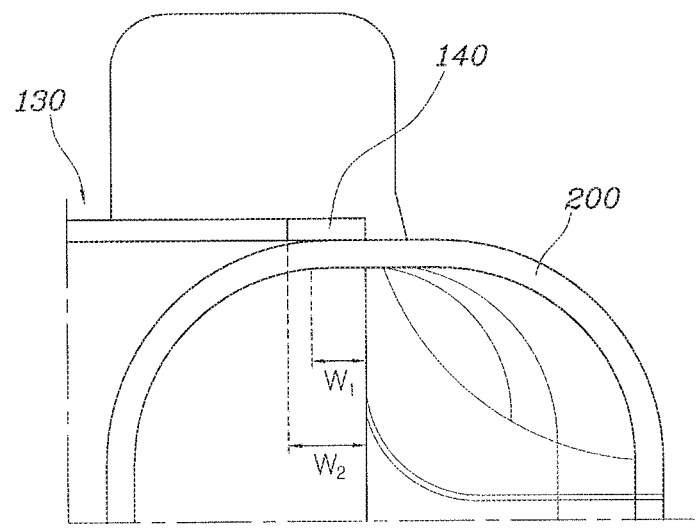

Hereinafter, a tubular type torsion beam according to an exmepalry embodiment of the present disclosure will be described with reference to the accompanying drawings. FIG. 1 illustrates an overall shape in which a torsion beam and a trailing arm may be coupled according to the present disclosure. FIG. 2 illustrates an exemplary shape of a plate material which is an intermediate material for manufacturing the torsion beam. FIGS. 3 and 4 illustrate an exemplary a detailed shape of the torsion beam. FIGS. 5 and 6 illustrate an exemplary shape of a coupling portion of the torsion beam and the trailing arm. In particular, FIG. 4A illustrates an exemplary A-A cross section of FIG. 3. FIG. 4B illustrates an exemplary B-B cross section of FIG. 3. FIG. 4C illustrates an exemplary C-C cross section of FIG. 3. FIG. 6 illustrates an exemplary D-D cross section of FIG. 5.

As illustrated in FIG. 1, a torsion beam 100 according to the present disclosure may be formed as a type of pipe shape that is coupled between a pair of trailing arms 200. Further, as illustrated in FIG. 2, the torsion beam 100 may be molded by bending a plate material 101 in a width direction and the plurality of side surfaces in the width direction may contact with each other and thereafter, the pipe-shaped torsion beam 100 may be welded and pressed into shapes illustrated in FIGS. 3 and 4.

Hereinafter, specific shapes of the torsion beam 100 and the plate material 101 for manufacturing the same will be described with reference to the drawings. A plurality of protrusions 140 may be formed on both side surfaces of the plate material 101 for manufacturing the torsion beam 100. When the plate material 101 is bent to enable the plurality of widthwise side surfaces of the plate material 101 to contact each other, each pair of protrusions 140 may contact each other. Accordingly, a gap of a predetermined width may be formed between the plurailty of side surfaces of the plate material 101. The gap may be maximize rigidity and durability of a welding portion by maintaining a welding penetration depth when a welding material W penetrates the gap to couple the both of side surfaces of the plate material 101 and an interval of the gap is about 0.2 to 2.0 mm or about 0.5 to 1.0 mm.

When the interval of the gap is less than 0.2 mm, the welding penetration depth may decrease and the rigidity and the durability of the welding portion may deteriorate. When the interval of the gap exceeds 2.0 mm, a back bead phenomenon in which the welding material W may pass through the gap and protrude to an interior surface of the torsion beam 100 may occur. Therefore, to maintain the gap at the above-mentioned interval, a height of the protrusion 140 may protrude from the plurality of the side surfaces of the plate material 101, a length may protrude in a width direction about 0.1 to 1.0 mm or about 0.25 to 0.5 mm.

As illustrated in FIGS. 3 and 4A-4C, the torsion beam 100 may be divided into a central portion 110, a variable portion 120, and a coupling portion 130 in a longitudinal direction. The central portion 110 may be formed at the center of the torsion beam 100. The variable portion 120 may extend from the plurality of end portions of the central portion 110, and the coupling portion 130 and may extend from the variable portion 120 and may be coupled with the trailing arm 200.

Each portion may be divided into a cross-sectional shape. The central portion 110 may be formed to have a cross-sectional shape with the lower portion concavely recessed into an inverted U shape. The coupling portion 130 may be formed to have a cross-sectional shape without a recessed portion. The cross-sectional shape of the variable portion 120 may gradually change from the cross-sectional shape of the central portion 110 to the cross-sectional shape of the coupling portion 130 in the longitudinal direction of the torsion beam 100. By varying the cross-sectional shape of the torsion beam 100 based on a position, force against torsional force at the central portion 110 may be strengthened, and lateral rigidity at the coupling portion 130 may be increased.

As illustrated in FIGS. 3 and 4A-4C, in an upper portion of the torsion beam 100, a portion where the plurality of widthwise side surfaces of the plate material 101 may be welded, a first upper plate material 111, a second upper plate material 121, and a third upper plate material 131 may be formed consecutively formed. In a lower portion of the torsion beam 100 in the central portion of the plate material 101, a first lower plate material 112, a second lower plate material 122, and a third lower plate material 132 may be consecutively formed.

When each region is described in more detail, as illustrated in FIGS. 3 and 4A, the central portion 110 may be divided into the first upper plate material 111 and the first lower plate material 112. The first upper plate material 111 may be formed by the portion where the plurality of widthwise side surfaces of the plate material 101 are coupled (e.g., welded) and may be formed in a round shape with the first upper plate material 111 convex in an upward direction. The first lower plate material 112 formed by the central portion of the plate material 101 may be formed to be press-inserted to an upper direction from the bottom and contact a partial region of the interior surface of the first upper plate material 111. The first upper plate material 111 and the first lower plate material 112 may be molded to contact each other, and the force against the torsional force may be strengthened.

However, when the first upper plate material 111 and the first lower plate material 112 are in close contact with each other (e.g., abut), friction and noise may be generated when the torsional force is applied to the first upper plate material 111 and the first lower plate material 112, and the durability may deteriorate. Therefore, the central portion of the first upper plate material 111, for example, the portion of the welding material W may be molded to prevent contact with the first lower plate material 112.

As illustrated in FIG. 3 and FIG. 4B, the variable portion 120 may be divided into the second upper plate material 121 formed by the plurality of side surfaces of the plate material 101 coupled with the welding material W. The second lower plate material 122 may be formed by the central portion of the plate material 101 and may be formed in the round shape having the second upper plate material 121 in an upward convex shape similar to the central portion 110. The second lower plate material 122 may be press-inserted in the upper direction from the bottom. In particular, the second upper plate material 121 and the second lower plate material 122 may be formed to prevent contact with each other. The cross-sectional shape of the variable portion 120 may gradually change to the cross-sectional shape of the coupling portion 130 from the cross-sectional shape of the central portion 110. By gradually changing the cross-sectional shape, the torsional force of the central portion 110 may be improved and the durability performance of the coupling portion 130 may be improved and a stress concentration phenomenon due to a sudden change in shape may be prevented.

As illustrated in FIGS. 3 and 4C, the coupling portion 130 may be divided into the third upper plate material 131 formed by the plurality of side surfaces of the plate material 101 coupled with the welding material W and the third lower plate material 132 may be formed by the central portion of the plate material 101 and the coupling portion 130 may be formed in a shape similar to a square or oval without a concave portion as a whole. In particular, a corner curvature of a round shape formed in the third upper plate material 131 may be formed greater than the corner curvature of the round shape formed in the third lower plate material 132. In other words, a corner of the third upper plate material 131 may have a smoother curved surface than the corner of the third lower plate material 132.

When a vortex is generated in the air flowing in the upper direction of the torsion beam 100 in vehicle operation resistance may increase and the corner of the third upper plate material 131 may have a greater curvature to reduce air resistance in the upper direction. The plate material 101 for manufacturing the torsion beam 100 may be formed to have the length thereof in the width direction increase from the central portion to the plurality of end portions in the longitudinal direction. In particular, the overall thickness of the plate material 101 may be substantially constant regardless of the position. By increasing the widthwise lengths of the plurality of end portions to be greater than the length of the central portion, circumferential lengths of the plurality of the end portions of the final torsion beam 100 may be greater than the circumferential length of the center portion, thereby enhancing the durability of the coupling portion 130.

Since the thickness of the torsion beam manufactured by molding the pipe in the related art decreases by extending the plurality of end portions of the torsion beam the durability deteriorates the torsion beam according to the present disclosure is not subjected to extension processing to maintain the durability thereof. A width of the plate material 101 forms the central portion 110 and the circumferential length of the central portion 110 of the torsion beam 100 may be about 306.2 mm and the circumferential length of the variable portion 120 may be about 318.6 mm, and the circumferential length of the coupling portion 130 may be about 333.1 mm even though the width may be based on a physical property required for the torsion beam 100. In particular, all of the thicknesses may be the same as each other at about 2.8 mm.

The positions and the number of the protrusions 140 formed on the plurality of side surfaces in the width direction of the plate material 101 may be adjusted. In particular, four pairs of protrusions 140 may be formed in the central portion 110 and a pair of protrusions 140 may be formed in each of the variable portion 120 and the coupling portion 130. In other words, when one variable portion 120 and one coupling portion 130 are formed on the plurality of end portions of the central portion 110, respectively, the total number of the protrusions 140 may be eight pairs. The longitudinal direction of the plate material 101 and the torsion beam 100 will be referred to as a lateral direction and the width direction of the plate material 101 and the torsion beam 100 will be referred to as a front-back direction.

When the position of the protrusion 140 is more specifically described, the protrusions 140 may be formed at positions spaced apart from lateral center lines by a predetermined distance in a center portion 110 of the plate material 101 and two pairs on a left side of the center line and two pairs on a right side of the center line may be formed symmetrically with respect to the center line. In particular, the protrusion 140 may not formed on the center line of the central portion 110 and a gap is formed to enable the welding material W to penetrate the gap. When the protrusions 140 are formed on the center line, cracks or breakage may occur on the welding portions when the torsional force is generated since the amount of the welding material W may be reduced where the protrusions 140 are in contact with each other.

The position of the protrusion 140 formed in the variable portion 120 of the plate material 101 is not significantly limited, but may be symmetrical with respect to the lateral center line of the torsion beam 100. The position of the protrusion 140 formed in the coupling portion 130 of the plate material 101 may be formed at a lateral end portion of the plate material 101. When the coupling portion 130 and the trailing arm 200 are coupled with each other, the end portion of the coupling portion 130 and the trailing arm 200 may be surface-coupled to prevent interference caused due to a back bead which occurs in the surface-coupled portion.

In other words, a position where the coupling portion 130 and the trailing arm 200 are surface-coupled to each other may correspond to where the plurality of side surfaces of the plate material 101 are welded. When the back bead is formed, since the coupling portion 130 and the trailing arm 200 do not contact with each other, the coupling power therebetween may be reduced. Therefore to prevent the back bead from occurring, the protrusion 140 may be formed at the end portion of the coupling portion 130 to block introduction of the welding material W, thereby reducing the welding penetration amount at the end portion of the coupling portion.

A lateral width $W_0$ of the protrusion 140 may be greater than the thickness of the plate material 101 and the protrusion 140 may have a lateral width $W_2$ greater than a width $W_1$ in which the coupling portion 130 and the trailing arm 200 are surface-coupled. Both the widths $W_0$ and $W_2$ of the protrusions 140 described below refer to a lateral size, (e.g., a longitudinal size) of the plate material. When the width $W_0$ of the protrusion 140 is less than the thickness of the plate material 101, an allowable error may be minimal when the plate material 101 is bent so that the protrusions 140 contact each other. Accordingly, process cost may increase and the strength of the protrusion 140 may be reduced and the protrusion 140 may be deformed by a load. Therefore, maintaining a gap of an effective interval may be difficult while welding.

Further, when the width $W_2$ of the protrusion 140 formed in the coupling portion 130 is less than the surface coupling width $W_1$ of the coupling portion 130 and the trailing arm 200, interference may occur by the back head flowing into an interior surface of the coupling portion 130 when the coupling portion 130 and the trailing arm 200 are coupled. Generally, penetration rate under a butt welding condition is approximately 30 to 70%. In particular, a welding portion that may include the central portion where the load is concentrated may be subjected to stress of approximately 290 to 471 MPa in a roll stiffness test. However, since the tubular torsion beam according to an exemplary embodiment of the present disclosure may stably form the gap through the protrusions the penetration rate reaches 100%. Since stress of approximately 253 MPa may be applied to the welding portion welded under such a condition, (e.g., the central portion) the stress may be reduced to enhance the durability.

According to the tubular type torsion beam of an exemplary the present disclosure, the following effects may be obtained. First, when the plate material is bent and welded to manufacture a torsion beam, a proper gap may be maintained through protrusions. Second, amount of welding penetration may be appropriately adjusted by maintaining the gap during welding. Third, a circumference length of both end portions of the torsion beam may be extended.

Therefore, it should be appreciated that the aforementioned exemplary embodiments are illustrative in all aspects and are not restricted. The scope of the present disclosure is represented by claims to be described below rather than the detailed description, and it is to be interpreted that the meaning and scope of the claims and all the changes or modified forms derived from the equivalents thereof come within the scope of the present disclosure.

What is claimed is:

1. A tubular torsion beam, comprising:
a plate material that is bent, welded and coupled, the plate material having a plurality of protrusions disposed on a plurality of side surfaces in a width direction,
wherein the plate material is molded in a pipe shape by bending the plate material in the width direction,
wherein the plurality of protrusions contact each other to form a gap between the plurality of side surfaces of the plate material, and thereafter, coupling the plurality of side surfaces of the plate material by welding,
wherein the torsion beam is divided into a pipe-shaped central portion having a lower portion with a concave cross section, a pipe-shaped coupling portion disposed on a plurality of end portions of the central portion and coupled with a trailing arm and having a cross section absent a recessed portion, and a pipe-shaped variable portion formed between the central portion and the coupling portion and having a cross-sectional shape which gradually changes, and
wherein the torsion beam is manufactured by the plate material having a width-direction length that increases toward the coupling portion from the central portion.

2. The tubular torsion beam of claim 1, wherein the plurality of protrusions is formed on the plurality of side surfaces that form the central portion in the plate material and are formed in a symmetric shape, which are spaced apart from each other by a predetermined gap in a longitudinal direction from the center of the central portion.

3. The tubular torsion beam of claim 1, wherein at least one protrusion is formed on the plurality of side surfaces that form the variable portion in the plate material.

4. The tubular torsion beam of claim 1, wherein at least one protrusion is formed on the plurality of side surfaces that form the coupling portion in the plate material, and a pair of protrusions among the protrusions formed on the plurality of side surfaces of the coupling portion is formed at a longitudinal end portion of the plate material and surface-coupled with the trailing arm.

5. The tubular torsion beam of claim 4, wherein a width of the protrusion formed in the coupling portion is equal to or greater than a width in which the coupling portion and the trailing arm are surface-coupled with each other.

6. The tubular torsion beam of claim 1, wherein the width of the protrusion is equal to or greater than a thickness of the plate material constituting a body of the torsion beam.

7. The tubular torsion beam of claim 1, wherein the central portion is divided into a first upper plate material formed a portion where the plurality of side surfaces of the plate material are coupled and a first lower plate material formed by the central portion of the plate material, the first upper plate material is formed in a round shape in which the first upper plate material is convex up, and the first lower plate material is molded to be press-inserted in an interior direction of the central portion and contact an interior surface of the first upper plate material and is prevented from contacting the central portion of the first upper plate material.

8. The tubular torsion beam of claim 7, wherein the variable portion is divided into a second upper plate material formed by the portion where the plurality of side surfaces of the plate material are coupled and a second lower plate material formed by the central portion of the plate material, the second upper plate material is formed in the round shape in which the second upper plate material is an upward convex shape, and the second lower plate material is molded to be press-inserted in the interior direction of the variable portion and is prevented from contacting the second upper plate material.

9. The tubular torsion beam of claim 8, wherein the coupling portion is divided into a third upper plate material formed by the portion where the plurality of side surfaces of the plate material are coupled and a third lower plate material formed by the central portion of the plate material, the third upper plate material is formed in a round shape in which the third upper plate material is an upward convex shape, and the third lower plate material is formed in a round shape in which the third lower plate material is a downward convex shape and formed in a shape with the third lower plate material has a curvature less than the third upper plate material.

* * * * *